No. 704,345. Patented July 8, 1902.
J. H. KINDSVATER.
COMBINED RAKE AND STACKER.
(Application filed May 10, 1901.)
(No Model.) 4 Sheets—Sheet 1.

WITNESSES:

INVENTOR
John H. Kindsvater
BY
ATTORNEYS

No. 704,345. Patented July 8, 1902.
J. H. KINDSVATER.
COMBINED RAKE AND STACKER.
(Application filed May 10, 1901.)
(No Model.) 4 Sheets—Sheet 2.

WITNESSES:
INVENTOR
John H. Kindsvater
BY
ATTORNEYS

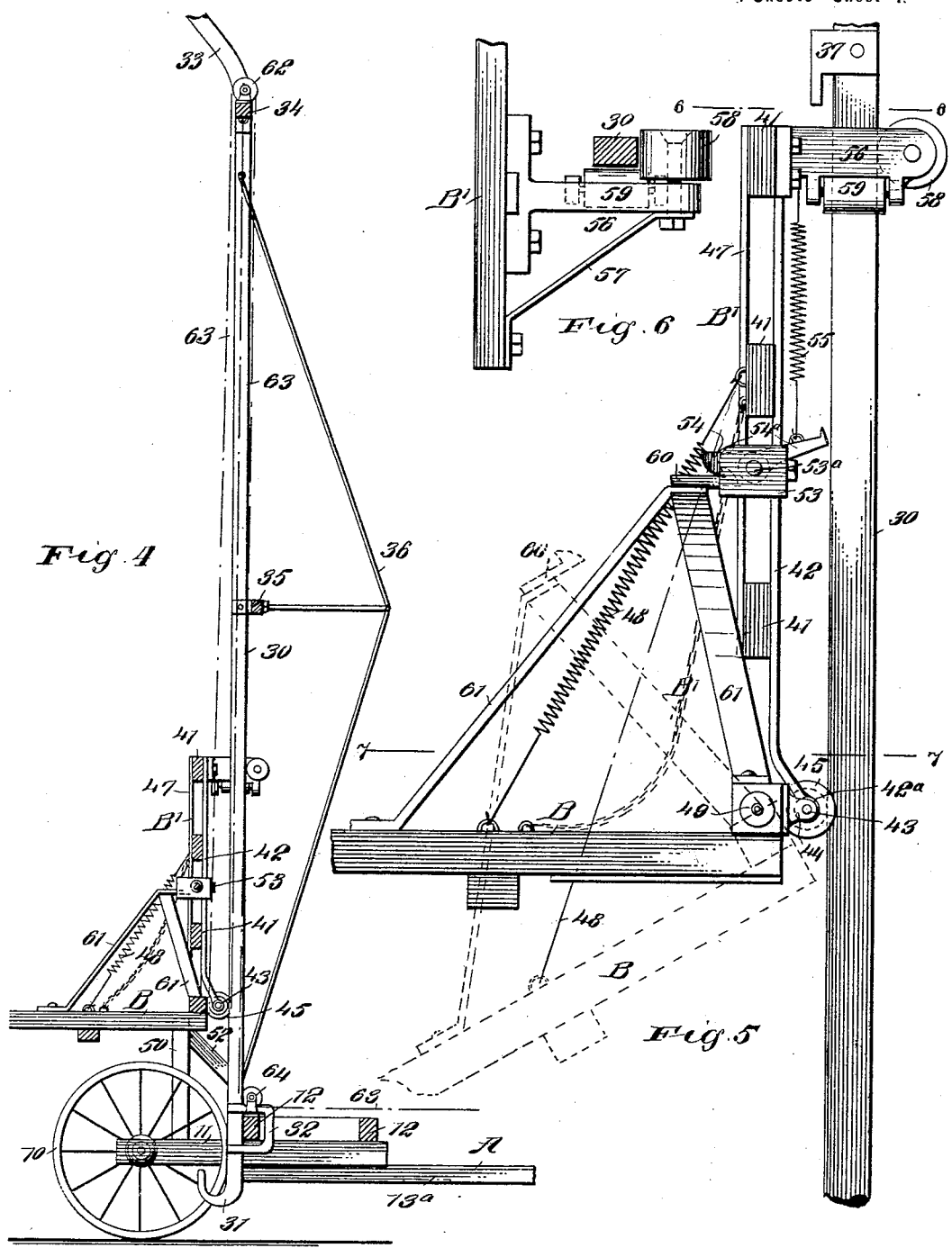

UNITED STATES PATENT OFFICE.

JOHN HENRY KINDSVATER, OF RUSSELL, KANSAS.

COMBINED RAKE AND STACKER.

SPECIFICATION forming part of Letters Patent No. 704,345, dated July 8, 1902.

Application filed May 10, 1901. Serial No. 59,619. (No model.)

*To all whom it may concern:*

Be it known that I, JOHN HENRY KINDSVATER, a citizen of the United States, and a resident of Russell, in the county of Russell and State of Kansas, have invented a new and Improved Combined Rake and Stacker, of which the following is a full, clear, and exact description.

The purpose of the invention is to provide a rake and stacker for use in connection with all kinds of grain and feed and which can be operated by one man and either one or two teams, according to the size of the machine used.

A further purpose of the invention is to so construct the machine that the rake may be carried to a gathering, carrying, and dumping position, the latter being automatically accomplished when a proper point is reached relative to the stack and while the machine is in motion.

Another purpose of the invention is to provide means for placing the rake in carrying or gathering position independent of the means for dumping the rake.

A further purpose of the invention is to construct the combined rake and stacker in such manner that it will be light yet durable and by means of which such feed as clover, alfalfa, &c., may be gathered and stacked with the least possible handling, thus tending to its preservation while in the stack.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
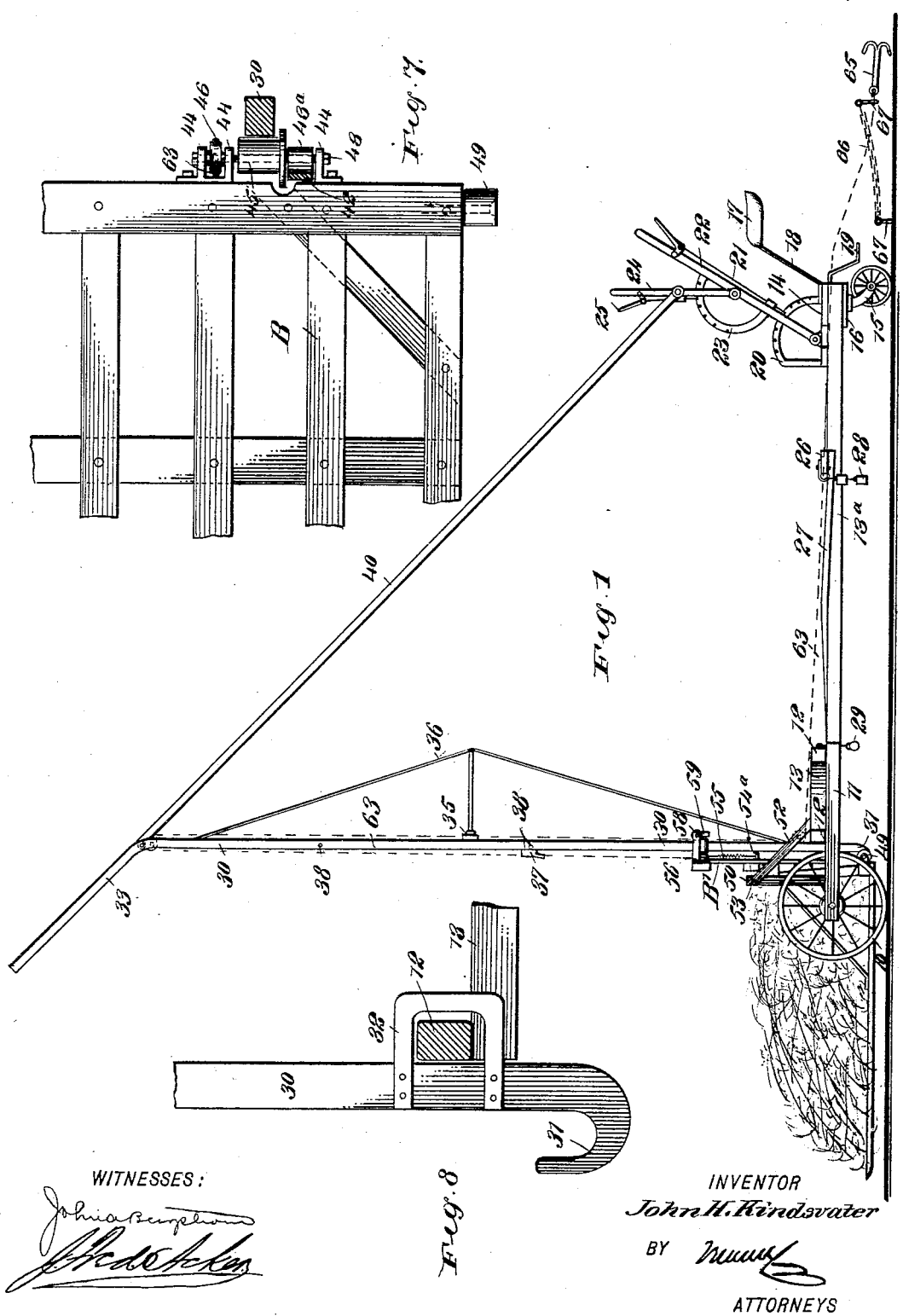
Figure 2:
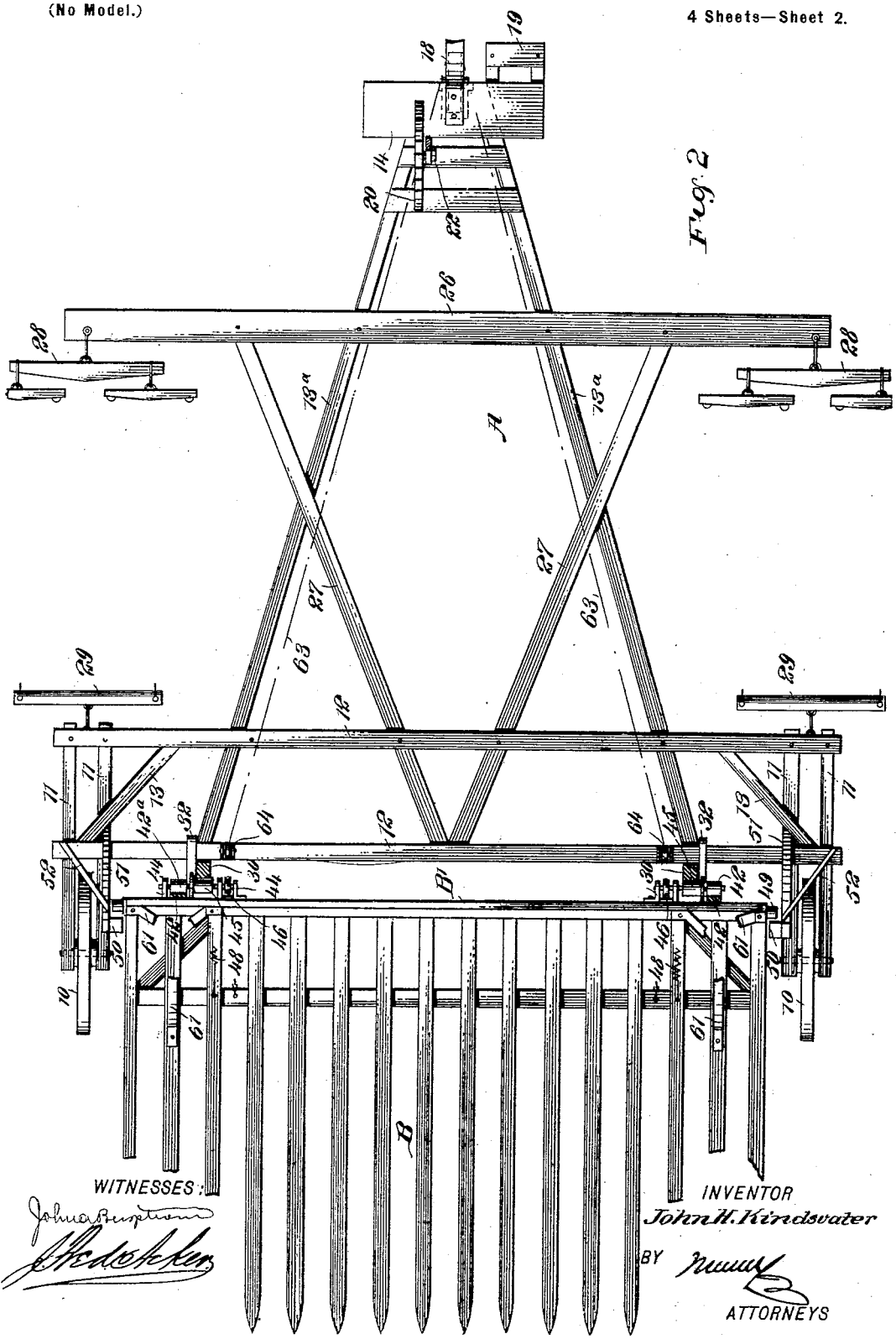
Figure 3:
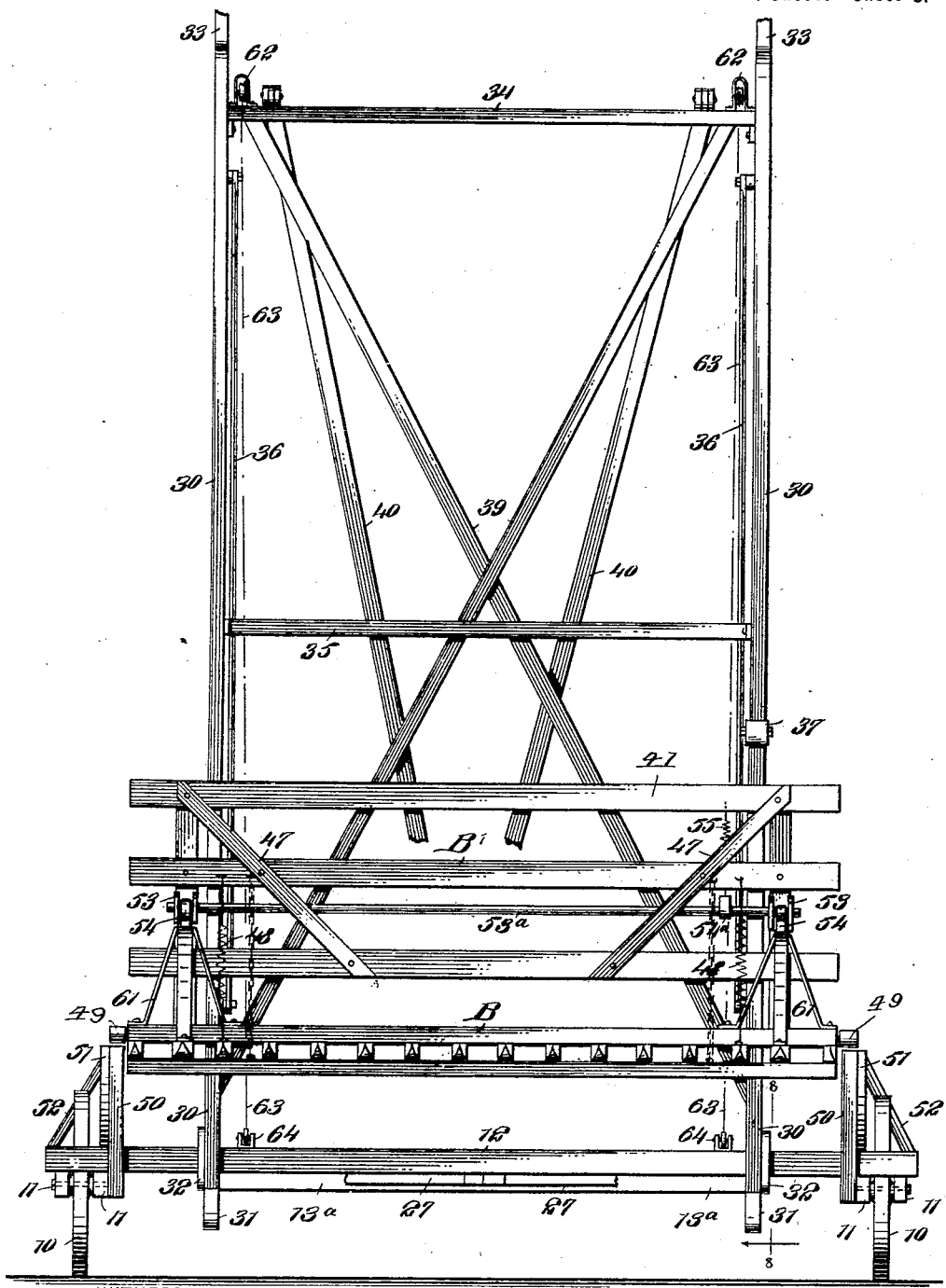

Figure 1 is a side elevation of the machine, illustrating the rake in carrying position. Fig. 2 is a sectional plan view of the machine, the section being taken horizontally through the upper portion of the rake-carrying frame, parts being omitted in the interest of clearness. Fig. 3 is a front elevation of the machine, the rake being shown partially raised. Fig. 4 is a vertical section through the machine, the rake being in the position shown in Fig. 3. Fig. 5 is an enlarged detail side view of a part of the rake and frame upon which it is mounted, illustrating the connection between the two. Fig. 6 is a horizontal section on the line 6 6 of Fig. 5. Fig. 7 is a horizontal section on the line 7 7 of Fig. 5; and Fig. 8 is a section of the lower portion of a side bar of the rake-carrying frame, illustrating the stirrup at its lower end and the manner in which the side bar is attached to the bed-frame of the machine, the section being taken on the line 8 8 of Fig. 3.

In the construction of the base-frame of the machine the forward wheels 10, one of which is at each side of the machine, are journaled between parallel bars longitudinally placed, and each pair of parallel longitudinal bars 11 is connected by cross or transverse bars 12, as is shown in Fig. 2. Diagonal beams 13 and 13ª are secured to the cross-bars 12, and the diagonal beams 13ª diverge at their forward ends and converge at their rear ends, and where the said diagonal beams 13ª come nearest together they support a platform 14 of any suitable character. Below this platform in a plate 16 or its equivalent a pilot-wheel 15 is mounted to turn. A seat 17 is attached to the upper portion of the platform 14 by means of a suitable standard 18, as illustrated in Fig. 1, and a step 19 is usually provided for the platform for the convenience of the driver in mounting the same. A rack 20 is secured to the platform 14, and a main lever 22 is pivoted on said platform, provided with a thumb-latch 21, adapted to engage with the rack 20. The main lever 22 is provided at its forward edge with a rack 23, and an auxiliary lever 24 is pivoted upon the main lever, provided with a thumb-latch 25, adapted for engagement with the rack 23.

The draft is preferably applied in the following manner: A cross-bar 26 is located upon the diagonal beams 13ª, near the rear ends thereof, braced by diagonal bars 27, converging at their forward ends, and the said diagonal bars 27 are attached to the cross-bar 26 and to the cross-bars 12 of the main frame. Draft-trees 28 are attached to the end portions of the rear cross-bar 26, the said draft-trees facing in a forward direction, and guide-bars 29 for the harness of the teams are pivotally attached to the end portions of the rear cross-bar 12 of the base-frame, as is shown in Fig. 2.

Uprights 30 extend from the forward cross-bar of the main frame as high as may be desired, and each of these bars 30, which constitute the side bars for a rake-supporting frame, is provided at its lower end with a hook or stirrup 31, as is shown in Fig. 8, and these hooks or stirrups extend below the base-frame. The side bars 30 of the rake-supporting frame have a rocking engagement with the base-frame A, and such attachment is usually brought about through the medium of yoke or U shaped fittings 32, which are attached to the side bars 30 of the rake-supporting frame and pass loosely around somewhat-rounded portions of the forward cross-bar 12 of the base-frame, as is also shown in Fig. 8. The upper end 33 of each side bar 30 of the rake-supporting frame is given an upward and forward inclination, as is best shown in Fig. 1, for a purpose to be hereinafter stated. The side bars of the rake-supporting frame where the upper inclined members 33 commence are connected by a cross-bar 34, and the said side members of the rake-supporting frame are further connected intermediate of their ends by a second cross-bar 35, as is best shown in Fig. 4. Each side bar 30 of the rake-supporting frame is provided with a truss-brace 36 at its rear portion, as is also best shown in Fig. 4.

Trip-blocks 37 extend forward from each of the side bars of the rake-supporting frame, and these trip-blocks are adjustable, being attached to the side bars of the rake-supporting frame through the medium of pins or bolts passed through the blocks and through apertures 38, made in the side bars. The rake-supporting frame is further braced by means of diagonal bars 39, which extend from opposite corners of said frame, crossing one another at the central portion of the frame.

Adjusting-arms 40 are pivotally attached to the upper cross-bar 34 of the rake-supporting frame, and these adjusting-arms extend downward and rearward, are brought practically together at their lower ends, and are connected, as shown in Fig. 1, with the smaller or auxiliary lever 24 at the rear of the machine.

A rake B is located at the front portion of the base-frame, which rake extends forward some distance beyond the forward extremity of the base-frame, and said rake may be of any suitable construction. The rake is provided with an upright back section B'. This back section consists of a series of transverse slats 41, which are connected at the back, near their ends, by metal cross-bars 42 and 47, the bars 42 terminating in knuckles 42ᵃ at their lower ends. Pintles 43 are passed through these knuckles and through apertured ears 44, secured to the rear face of the rake-head, and these ears are in duplicate at the inner portions of the pintles, as is best shown in Fig. 7. A roller 45 is mounted to turn on each pintle 43, adapted for engagement with the forward edges of the side bars of the rake-supporting frame, and between the inner pair of ears 44 pulleys 46 are mounted to turn on the said pintles 43, as is likewise shown in Fig. 7. The rake B and its back section B' are also connected at the front by springs 48 and also chains, which limit the downward movement of the rake relative to its back section. At each end of the rake-head a roller 49 is mounted to turn, and these rollers are adapted to engage with the inner faces of uprights 50, secured upon the inner longitudinal beams 11, between which the forward wheels are mounted to turn, and these uprights 50 are held in position by means of braces 51 and 52, as is shown in Fig. 2. These uprights 50 serve to guide the rake in its downward movement, and when the rake is in its lowest position or in position for work the rollers 45 enter the hooks 31 at the bottom portions of the sides of the rake-supporting frame. A forwardly-extending boxing 53 is secured to each hinged cross bar or strap 42 of the back section of the rake, and a rod 53ᵃ is passed through the said boxings, which rod 53ᵃ is provided with polygonal sections near or at its ends. A latch 54ᵃ is located in each boxing 53, secured to a polygonal portion of the rock-shaft or rod 53ᵃ, and near one end of the rod or rock-shaft 53ᵃ an arm 54 is secured, extending in an opposite direction to the latch 54ᵃ at one end of a spring 55, the other end of the spring being secured to the upper portion of the back section of the rake in any approved manner, so that as the rake is drawn up upon its supporting-frame the rearwardly-projecting spring-controlled arm 54ᵃ will engage with the trip 37 on the supporting-frame of the rake and will release the rake in a manner to be hereinafter described and permit the rake to assume a dumping position and discharge its load.

A horizontal arm 56 is secured to the rear upper portion of the back section B' of the rake outside of the rake-supporting frame, and each arm 56 is provided with suitable braces 57 and carries a roller 58, adapted to engage with the rear edge of the side sections of the rake-supporting frame, as is shown in Figs. 5 and 6. The springs 48, connecting the rake with its back section, in addition to limiting the downward movement of the rake serve to prevent the jerking movement on the part of the rake, which would occur when the load slides off if a more rigid back were provided. Each latch 54 when the rake B is in working position, as shown in Fig. 5, is adapted for engagement with a keeper 60, and these keepers are mounted upon brackets 61, secured to the upper face of the rake near its sides. In Fig. 5 these keepers are clearly shown in dotted lines, as the rake is shown in dotted position in dotted lines. The arms 56 also carry friction-rollers 59, which engage with the sides of the side bars 30.

The rake is raised upon its supporting-frame through the medium of ropes 63. These ropes are attached to the upper cross-bar 34 of the rake-supporting frame and are passed down over the pulleys 46, carried by the rake-head, and thence up over pulleys 62, located on the cross-bar 34, and from the said pulleys 62 the ropes 63 are carried downward over pulleys 64, located on the rear cross-bar 12 of the base-frame, and from these pulleys 64 the ropes are carried over suitable guides at the rear end of the base-frame and out beyond the said end, being attached to an anchor 65 or a like drag.

In connection with the machine a chain 66 is employed of suitable length and provided with pins 67 at its ends, adapted to be driven in the ground, as is illustrated in Fig. 1.

In operation when the machine is driven into a field the operator throws the main lever 22 forward, which action inclines the rake-supporting frame forwardly and causes the rake-teeth to point downward. The material will now be gathered up by the rake, and when the rake is loaded the main lever 22 is thrown rearward, bringing the teeth of the rake to a substantially horizontal or carrying position. The machine is now driven to the stack. About eighteen feet from the center of where the rick is to be placed the chain 66, which is about three feet in length, is fastened to the ground by means of the pins 67. The operator now drives the machine so that the anchor grapple or hook 65 can be thrown down to engage with the chain. This is done while the machine is in motion. Immediately the loaded rake will rise and will continue to rise while the machine is being drawn forward. By the time the machine has moved forward eighteen feet the arm 54$^a$ of the rake will strike the trip 37 on the upright of the rake-supporting frame, releasing the latches 54 from the keepers 60, whereupon the rake will drop to the dotted position shown in Fig. 5 and the load will be dumped in the center of the stack. When the load is discharged, the springs 48 raise the rake to a certain extent. The machine is now reversed and the operator unhooks the anchor from the chain and hooks it upon the seat or like support and throws the main lever 22 forward, which brings the latches 54 and their keepers into locking engagement, after which the machine is ready to gather another load.

The auxiliary lever 24 is used for throwing the teeth downward when the material sticks close to the ground and also for throwing the teeth upward when the rake is loaded and being raised to prevent the material falling off. As the stack increases in size the trip 37 is placed higher up. The chain is placed farther from the stack, and the dumping progresses in the same manner as heretofore described. In finishing the stack the trip 37 can be entirely removed and the rake can be run up the full length of the uprights 30.

From the foregoing description, taken in connection with the drawings, it will be understood that the back section of the rake is mounted on the upright rake-supporting frame to have slidable movement thereon, and this slidable movement continues throughout the full length of the frame and the inclined sections 33 at the upper extremity thereof. It will be further understood that the rake consists of two members—namely, the rake proper, B, and the back section B'— and these two members are normally disposed at an angle to each other, so that the back section B' will normally occupy an upright position, while the other section or rake proper, B, extends outwardly from the back section B'. The two parts or members comprising the rake B B' are hinged or pivotally connected together in order that the outwardly-extending member B may have relative movement to the upright member or back section B'; but the two parts or members are held in their operative relation by the employment of the latch mechanism. This latch mechanism on the elevation of the rake to the proper point is automatically tripped by engagement with the stop or stops 37, provided on the upright rake-supporting frame, whereby the outwardly-extending member B of the rake is automatically released when the load reaches the proper point, and said outwardly-extending member B is adapted to drop or fall to the inclined dumping position, which is indicated by dotted lines in Fig. 5. The stop 37 on the upright rake-supporting frame is shiftable thereon to assume different positions in order to release the rake mechanism at different heights, whereby the load may be discharged upon the stack in order to build up the same. As the height of the stack increases by the successive discharge of loads of hay thereon the stop 37 is raised upon the frame until the stack reaches a height equivalent to the height of the rake-supporting frame. At this period in the operation of the apparatus the stop or stops 37 are removed from the upright rake-supporting frame and the rake is permitted to travel throughout the full length of said frame and upon the inclined sections 33 thereof. As the carrying-wheels of the back section of the rake travel upon the inclined portions 33 of the upright frame the rake is made to partake of the inclination of said sections 33, in consequence of which the outwardly-extending member of the rake is made to assume an inclined position equivalent to the dumping position secured by releasing the latch mechanism, whereby the rake will automatically discharge its load upon the rick or stack when it traverses said inclined sections 33 of the upright frame.

Material such as clover and alfalfa loses much of its value from being handled. This machine lessens the necessity of handling to a great extent over the ordinary way, thus saving in time and in material. Ricks or stacks can be made much larger with the improved machine than by the use of any other with which I am familiar, and the feed will keep much better when stacked by my machine, as every rakeful may be thrown wherever the stacker wishes and always in the center of the rick or stack.

Another advantage which the machine possesses is its adaptability to handling material in windy weather, as the rake can be dumped but a few feet above the stack or rick, while with most stackers every rakeful must go to the top of the stack before it can be dumped, and thus the wind is given an opportunity to blow it away.

Having thus described my invention, I claim as new and desire to secure by Letters Patent—

1. In a combined hay rake and stacker, a rake consisting of an upright back member, a forwardly-extending toothed member disposed at an angle to the back member and pivotally connected thereto, brackets attached to the toothed rake member and provided with latch-keepers, and a latch-rod mounted on the upright rake member and having latches adapted to engage with said keepers, combined with an upright rake-supporting frame on which the back member of said rake is fitted, means for limiting the back rake member to slidable movement on said rake-supporting frame, means for bodily raising the rake, and a trip mechanism disposed in the path of said latch-rod and adapted for engagement automatically therewith on the elevation of said rake to a predetermined position.

2. In a combined hay rake and stacker, the combination of a wheeled carrying-frame, and upright rake-supporting frame pivoted thereon and provided with depending stirrups, and adjusting devices connected to said upright frame for shifting the latter to different inclined positions, a two-part rake having its members pivoted together and one of said members limited to slidable movement on said upright frame and adapted to be lowered into engagement with said depending stirrups, a latch mechanism for holding said members of the rake in rigid operative relation, coacting guide devices on the wheeled frame and the rake, and adapted to maintain the latter in fixed relation to said frame when the rake is lowered into engagement with the stirrups, a projection disposed on the upright frame in the path of the latch mechanism, and mechanism for bodily hoisting the rake.

3. In a hay rake and stacker, the combination, with a wheel-supported frame, a vertical frame pivoted upon the wheel-supported frame, and an adjustable trip carried by the pivoted frame, of a support having roller-bearings upon the pivoted frame, a rake hinged to said support, a shaft carried by the support, latches secured to said shaft, keepers carried by the rake and adapted for engagement with said latches, an arm projected from the shaft and arranged to be engaged by said trip, and means, operated by the movement of the machine, for raising the rake, substantially as described.

4. In a hay rake and stacker, the combination, with a wheel-supported frame, an upright frame pivotally connected with the wheel-supported frame, said upright frame being provided with a forwardly-extending upper section, and a trip secured to the said upright frame, of a support having roller-bearings upon the upright frame and adapted to travel thereon, a rake having hinged connection with said support, latches carried by the support, keepers for the latches carried by the rake, an arm operating the latches and adapted for engagement with the trip on the upright frame, a series of ropes attached to the upper portion of the upright frame and passed over pulleys attached to the head of the rake and over pulleys at the upper portion of the upright frame, thence over pulleys carried by the wheel-supported frame, the ropes being connected at their rear ends, and a drag or anchor attached to the said connected ropes, as and for the purpose specified.

5. In a combined hay rake and loader, the combination with an upright frame, of a two-part rake having members pivoted together and arranged for one member to travel on the upright frame, a latch mechanism between the rake members, means for hoisting the rake, means for tripping the latch, and a spring connecting the members of the rake and held normally in an inactive condition by maintenance of the rake members in an operative condition, said spring being movable vertically with the rake as a part thereof and adapted to be brought automatically into service on the release of the latch by the tripping device and the dropping of one rake member to a dumping position.

6. In a combined hay rake and stacker, the combination of a wheeled base-frame, an upright frame pivotally mounted thereon, and provided with stirrups arranged to depend below the axle of the wheeled frame, a rake having one member thereof provided with carrying-wheels, that are arranged to travel upon the upright frame and to descend into engagement with said stirrups, means for tilting the upright frame, and bringing the rake into operative position, to collect the load, and mechanism for bodily hoisting the rake, substantially as described.

7. In a combined hay rake and stacker, a rake consisting of an upright slatted member, an outwardly-extending toothed member, connected pivotally with the said upright member, brackets attached to the outwardly-extending member and provided with keepers, and a latch-rod mounted on the upright member and provided with latches for engagement with said keepers, combined with an upright frame on which the back member of the rake is mounted, means for limiting the back rake member to slidable movement and in a vertical path to said upright frame, trip devices supported on said upright frame and adapted to actuate the latch-rod, and means for bodily hoisting said rake, substantially as described.

8. In a combined hay rake and stacker, a rake consisting of an upright member provided with carrying-wheels facing in directions at right angles to each other, an outwardly-extending member pivoted to said upright member, brackets fast with said outwardly-extending member and provided with keepers, a latch-rod mounted on the upright member, and having a rearwardly-extending arm, latches fast with the latch-rod, and arranged for engagement with said keepers, and a spring connected with said arm on the latch-rod, combined with an upright frame, on which the rollers of the back rake member are adapted to travel, and a trip mounted on the upright frame in the path of said arm on the latch-rod.

9. In a combined hay rake and stacker, the combination of a wheeled supporting-frame provided with a suitable cross-bar, an upright rake-supporting frame having the depending stirrups and the yokes which are loosely engaged with said cross-bar, a main lever mounted on a wheeled frame and adapted to be held in different positions by suitable locking devices, a segment carried by the main lever, an auxiliary lever fulcrumed on the main lever and adapted for engagement with said segment, operative connections between the upright frame and the auxiliary lever, a rake slidably mounted on the upright frame and adapted to be lowered into engagement with the stirrups, and a hoisting mechanism for said rake.

In testimony whereof I have signed my name to this specification in the presence of two subscribing witnesses.

JOHN HENRY KINDSVATER.

Witnesses:
L. B. BEARDSLEY,
H. C. LAUBMANN.